(12) United States Patent
Johnson et al.

(10) Patent No.: US 6,556,826 B1
(45) Date of Patent: Apr. 29, 2003

(54) COMMUNICATION VALET DEVICE

(75) Inventors: Harold Johnson, Roach, MO (US);
Timothy D. Euler, Leawood, KS (US);
Barry Tishgart, Prairie Village, KS (US)

(73) Assignee: Sprint Communications Company, L.P., Overland Park, KS (US)

( * ) Notice: Subject to any disclaimer, the term of this patent is extended or adjusted under 35 U.S.C. 154(b) by 0 days.

(21) Appl. No.: 09/503,894

(22) Filed: Feb. 15, 2000

(51) Int. Cl.$^7$ ................................................. H04Q 7/00
(52) U.S. Cl. ........................ 455/426; 455/509; 455/450; 455/452; 455/512
(58) Field of Search ................................. 455/512, 426, 455/452, 509, 450; 370/410, 401, 400, 396, 259, 260

(56) References Cited

U.S. PATENT DOCUMENTS 5,495,484 A * 2/1996 Self et al. .................... 370/401
5,991,292 A * 11/1999 Focsaneanu et al. ........ 370/338
6,002,689 A * 12/1999 Christie et al. ............. 370/401

* cited by examiner

*Primary Examiner*—Thanh Cong Le
*Assistant Examiner*—Tsuleun Lei
(74) *Attorney, Agent, or Firm*—Harley R. Ball; Steven J. Funk; Kevin D. Robb (57) ABSTRACT

A communication device comprising a processing system, a network interface system, a wireless interface system, and a wireline interface system. The processing system is configured to exchange information with a communication network at user-controllable time intervals, provide retrieved information to at least one of a wireless communication device and a wireline communication device based on a user profile, and dynamically adjust the information exchange based on a network capacity. The network interface system is configured to exchange information retrieval messages with the communication network and exchange the information with the communication network under control of the processing system. The wireless interface system is configured to exchange information with the wireless communication device under control of the processing system. The wireline interface system is configured to exchange information with the wireline device under control of the processing system.

60 Claims, 4 Drawing Sheets

COMMUNICATION VALET DEVICE

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention relates to communication devices, and specifically, to a communication device that integrates wireless and wireline technologies to control information exchange with communication networks.

2. Description of the Prior Art

Wireline communication networks provide various services, such as telephony, email, information content services, and internet access using wireline communication paths. Wireline communication networks provide fixed service to a place. Wireless communication networks provide similar services using wireless communication paths. Wireless communication networks provide mobile service to a person. Wireline communication paths are physically tangible mediums between wireline devices. Examples of wireline communication paths include copper, aluminum, and fiber optic cabling carrying protocols such as Synchronous Optical Network (SONET), Asynchronous Transfer Mode (ATM), Transmission Control Protocol/Internet Protocol (TCP/IP), Ethernet, T1, DS3, and dense wave division multiplex fiber optic lines. Wireless communication paths propagate electromagnetic radiation over an air interface between wireless devices. Examples of wireless communication paths include personal communications service (PCS) links, microwave multipoint distribution service (MMDS), millimeter wave links, code division multiple access (CDMA) links, time division multiple access (TDMA) links, spread spectrum links, and microwave links.

Unfortunately, wireless communication service and wireline communication service are mutually exclusive and independent. As a result, duplication occurs when customers require a similar service for both a wireless device and a wireline device. For example, a customer that requires email service at the office and on a cellular telephone would subscribe to a wireless service and a wireline service. In addition, these multiple services are inconvenient and time consuming to the user and result in increased demands on the providing network during busy periods and peak traffic conditions.

Docking station technology provides one solution to the problem of duplicate services. Docking stations enable wireless devices to be utilized with a wireline service. For example docking stations permit mobile devices such as personal digital assistants (PDA's) and/or PCS handsets to utilize wireline telephone technology to access email and internet services. Nevertheless, docking stations are limited to a fixed environment of use and still require a wireless service to provide mobile communication outside of the docked environment.

SUMMARY OF THE INVENTION

The present invention advances the art by providing a communication device that integrates wireless and wireline technology and controls access and information exchange with communication networks based on user needs and network capacity. The communication device comprises a processing system coupled to a wireless interface system, a wireline interface system, and a network interface system. The processing system is configured to exchange information with the communication network at user-controllable time intervals and provide retrieved information to at least one of a wireless communication device and a wireline communication device based on a user profile. The processing system is further configured to dynamically adjust the information exchange with the network based on the network's capacity. The network interface system is configured to exchange information retrieval messages with the communication network and receive information from the communication network under control of the processing system. The wireless interface system is configured to provide the retrieved information to the wireless communication device under control of the processing system. The wireline interface system is configured to provide the received information to the wireline device under control of the processing system.

The user profile is a set of instructions defined by the user to manage information retrieval and delivery. Advantageously, the user profile permits scheduling of information retrieval during off-peak and non-busy periods, such as early morning hours. Also advantageously, the present invention eliminates duplicate service requirements and reduces network traffic. Yet another advantage of the present invention is that it coordinates with network resources to utilize available network capacity and manage information retrieval and delivery based on current network capacity. The coordinated information retrieval based on network capacity reduces network traffic improving throughput speeds and economics during periods of traffic congestion.

DETAILED DESCRIPTION OF THE PREFERRED EMBODIMENT

Figure 1:
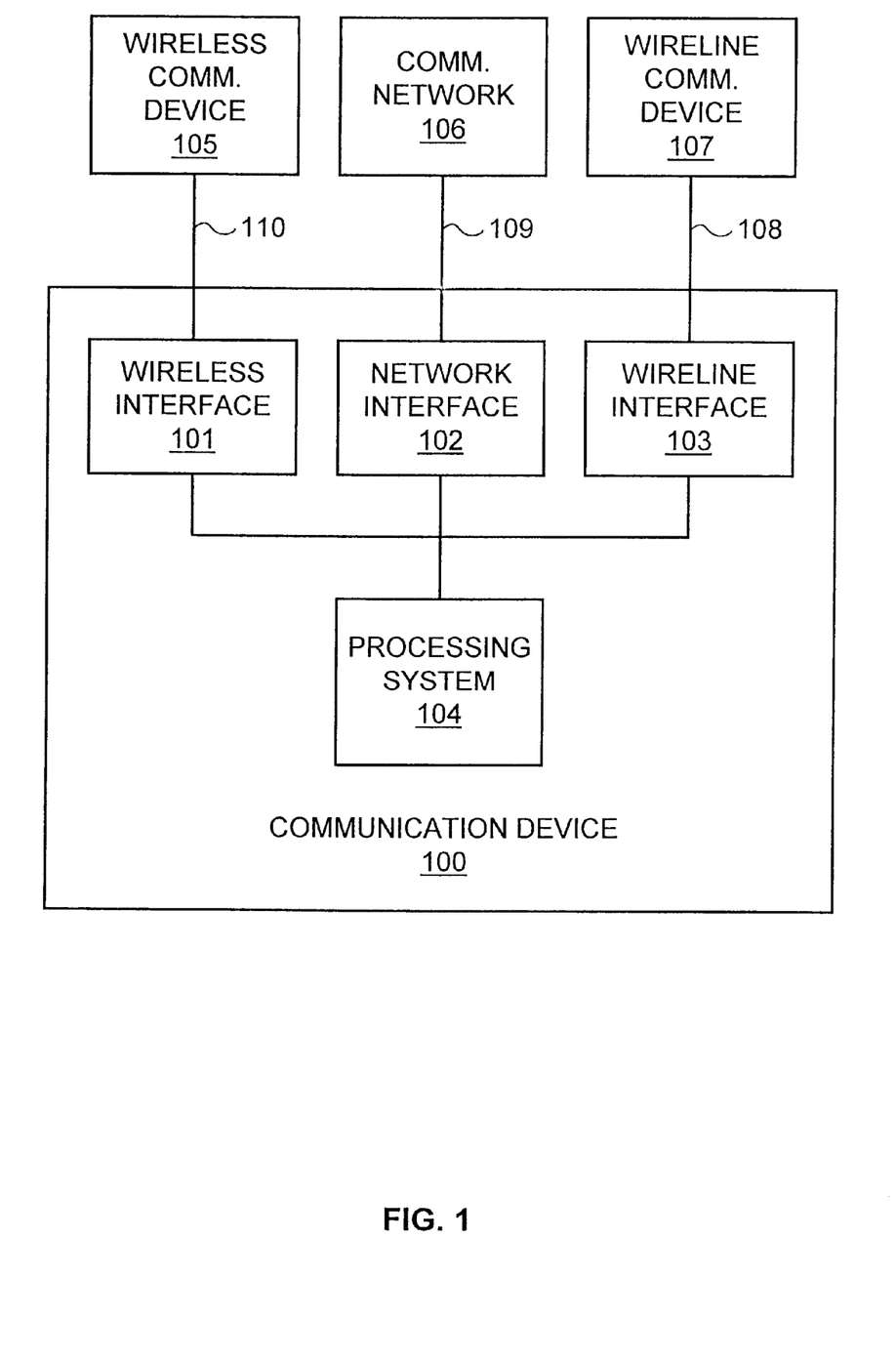
FIG. 1 illustrates an example of a network architecture according to the present invention.
Figure 2:
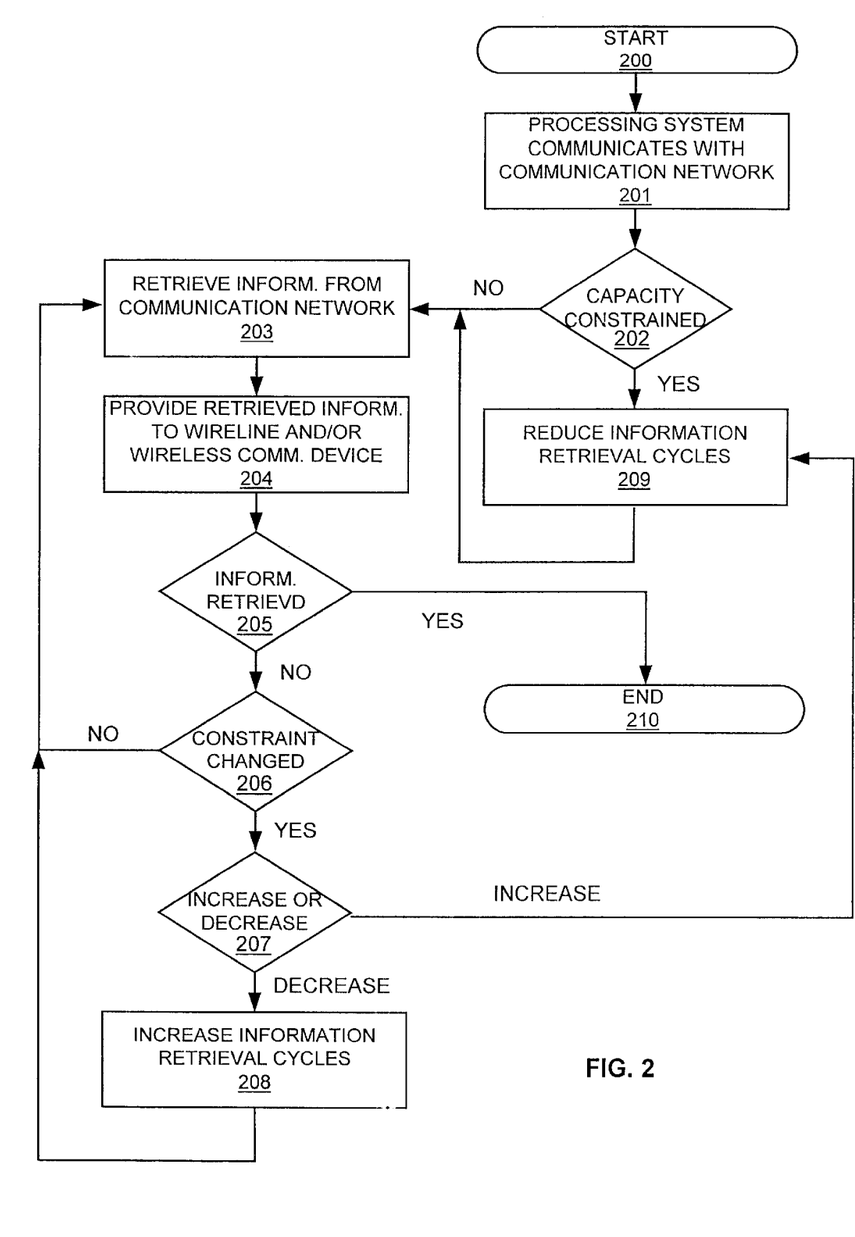
FIG. 2 illustrates an example of the operational steps of a communication device according to the present invention.

Network Configuration and Operation FIGS. 1–2:

FIG. 1 depicts an example of a communication device 100 according to the present invention, a wireless communication device 105, a communication network 106, and a wireline communication device 107. The communication device 100 comprises a wireless interface system 101, a network interface system 102, a wireline interface system 103, and a processing system 104.

The processing system 104 is connected to the wireless interface system 101, the network interface system 102, and the wireline interface system 103. The wireless interface system 101 is connected to the wireline interface system 103 by wireless communication path 110 and is connected to the network interface system 102 and the wireline interface system 103. The network interface system 102 is connected to the communication network 106 by communication path 109. Communication path 109 could be a conventional wireless communication path, wireline communication path or both. The wireline interface system 103 is connected to the wireline communication device 107 by communication path 108. The communication path 108 could be a conventional wireline communication path.

The wireless communication device 105 could be any wireless device configured to exchange information such as audio, video or data over a wireless communication path 110. Some examples of the wireless device 105 include without limitation, a telephone, a pager, a computer, and a PDA. The wireline communication device 107 could be any wireline device configured to exchange information such as audio, video or data over the wireline communication path 108. Some examples of the wireline device 107 include without limitation, a telephone, a computer, a facsimile machine, an answering machine, a stereo, a television, or a modem.

The communication network 106 could be any wireless or wireline communication network capable of interfacing with communication device 100. Some examples of the communication network 106 include without limitation, a packet network, the public switched telephone network, an internet, an intranet, an ethernet, an extranet, a local area network, and/or a wide area network.

The processing system 104 could be any processor or plurality of processors configured to: 1) exchange information with the communication network 106 at user-controllable time intervals, 2) provide retrieved information to at least one of the wireless communication device 105 and the wireline communication device 107 based on a user profile, and 3) dynamically adjust the information exchange based on a capacity of the communication network 106. The user profile could be stored on the processing system 104 or on an external device such as the wireline device 107. The information could be any information provided by or carried over the communication network 106. Some examples of the information include without limitation, data information, video information, and audio information.

The network interface system 102 could be any device or plurality of devices configured to exchange information retrieval messages with the communication network 106 and exchange the information with the communication network 106 under control of the processing system 104. The wireless interface system 101 could be any device or plurality of devices configured to exchange information with the wireless communication device 105 under control of the processing system 104. The wireline interface system 102 could be any device or plurality of devices configured to exchange information with the wireline device 107 under control of the processing system 104.

FIG. 2 is a flow chart illustrating one example of the operation of the communication device 100 according to the present invention. The operation begins at step 200. At step 201, the processing system 104 communicates with the communication network 106 via the network interface system 102 at user defined time intervals. The time intervals are defined in the user profile setup prior to communication with the communication network 106. If the capacity of the communication network 106 is constrained at step 202, the processing system 104 reduces the information retrieval cycles at step 209. Those skilled in the art will appreciate that there are multiple methods the processing system 104 could use to determine that the capacity of communication network 106 is constrained. Some examples include, receiving a capacity constrained message from the communication network 106 or detection based on access and response times. If the capacity of the communication network 106 is not constrained at step 202, processing proceeds through steps 203–207 as described below until the information is retrieved at step 205 and processing ends at step 210.

Responsive to reducing the number of information retrieval cycles at step 209, the processing system 104 retrieves information from the communication network 106 at the reduced information retrieval rate at step 203. At step 204, the processing system 104 provides retrieved information to one or both of the wireline device 107 and the wireless device 106 via the wireless interface system 101 and the wireline interface system 103. The information is provided according to the information delivery parameters defined in the user profile. If all of the requested information is retrieved from the communication network 106 at step 205, the operation ends at step 210. Otherwise processing proceeds at step 206. If the capacity of the communication network 106 has changed at step 206, processing continues at step 207, otherwise processing continues at step 203. If the constraint has decreased at step 207, the processing system 104 increases the information retrieval cycles at step 208 and continues to retrieve information at step 203 at the increased retrieval rate. If the constraint has increased at step 207, the processing system 104 decreases the information retrievals cycles at step 209 and continues to retrieve information at step 203 at the decreased retrieval rate. Steps 203–207 are repeated until the information is retrieved at step 205 and processing ends at step 210.

Figure 3:
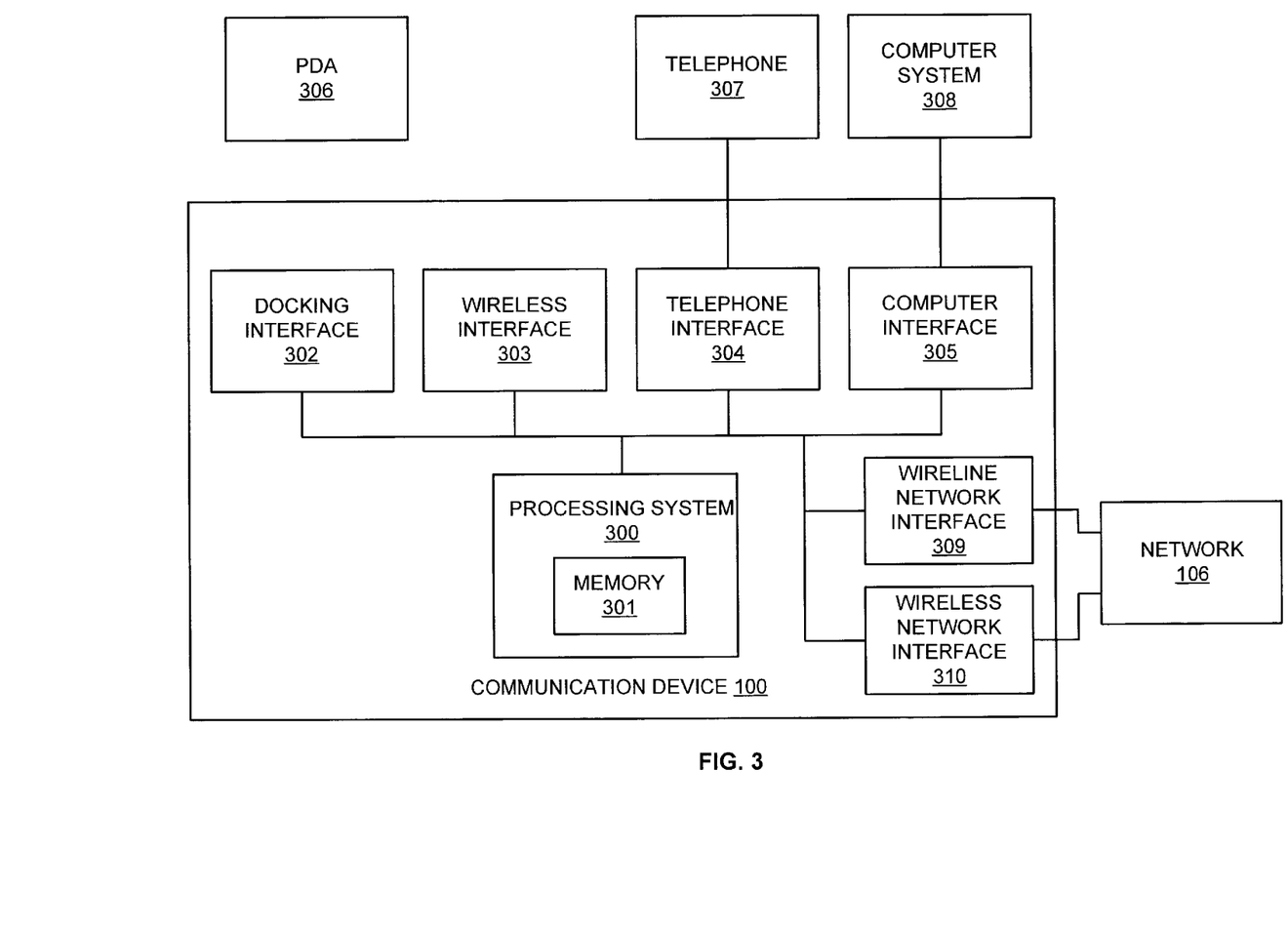
FIG. 3 illustrates an example of a communication device according to the present invention.

Communication Device FIG. 3:

FIG. 3 illustrates another example of the communication device 100 of the present invention. Those skilled in the art will appreciate numerous variations that do not depart from the present invention. Those skilled in the art will also appreciate that various features described below could be combined with the above described embodiment to form multiple variations of the invention.

FIG. 3 depicts the communication device 100, a PDA 306, a telephone 307, a computer system 308, and the communication network 106. The communication device 100 comprises a docking interface system 302, a wireless interface system 303, a telephone interface system 304, a computer interface system 305, a processing system 300, a wireline network interface 309, and a wireless network interface 310. The processing system 300 includes a memory 301 and is connected to the docking interface system 302, the wireless interface system 303, the telephone interface system 304, the computer interface system 305, the wireline network interface system 309, and the wireless network interface system 310.

The wireless interface system 303 could be any device or group of devices configured to exchange wireless communications with the PDA 306 over a wireless communication path. Some examples of the wireless communication path could include without limitation, a multipoint multichannel distribution path, a personal communication service path, and a millimeter wave path using code division multiple access or time division multiple access technology. In some examples of the present invention, the wireless interface system 303 could also function as the network interface for the communication device 100 to provide network connectivity and exchange information retrieval messages and information with the communication network 106. Those skilled in the art will appreciate that the wireless interface system 303 would include various conventional components such as a wireless transceiver not shown on FIG. 3 for clarity.

The docking interface system 302 could be any device or plurality of devices configured to receive PDA 306 and interface PDA 306 with the telephone 307 and the computer system 308. The docking interface system 302 could be a conventional docking circuit that includes conventional components such as a power supply, expansion slots, monitor connectors, keyboard connectors, and extra memory connectors not shown on FIG. 3 for clarity. Those skilled in the art will also appreciate that wireless interface system 303 could also be a part of docking interface system 302.

The telephone interface system 304 could be a conventional voice interface that acts as a POTS interface, supervises signals, channels voice lines, or resolves contention between voice lines. The telephone interface system 304 could also provide local loop voice functionality including dial tone and wireline feature transparency as well as VoIP technology. In some examples of the present invention, the telephone interface system 304 could function as the network interface for communication device 100 to exchange information retrieval messages and information with the communication network 106.

The computer interface system 305 could be any device or group of devices configured to exchange information with the computer system 308 under the control of processing system 300. The computer interface system 305 could also be configured to provide high-speed data service, digital subscriber line and/or cable modem technology, and voice over IP (VoIP) applications. The VoIP applications could include VoIP prioritization using either policy enforcement point to point protocol (PPP) over ethernet technology or IP/virtual private network (VPN) and policy based routing technologies. The computer interface system 305 could also act as a POTS interface, supervise signals, channel voice lines, or resolve contention between voice lines. In some examples of the present invention, the computer interface system 305 could also function as the network interface for the communication device 100 to provide network connectivity and exchange information retrieval messages and information with the communication network 106.

The wireline network interface system 309 could be any device or group of devices configured to exchange information with the communication network 106. One example of the wireline network interface system 309 includes without limitation, a metropolitan fiber ring interface system using SONET and/or ATM protocols. The wireless network interface system 310 could be any device or group of devices configured to exchange information with the communication network 106. One example of the wireless network interface system 310 includes without limitation, a terrestrial microwave system. The wireline interface system 309 and the wireless interface system 310 could also provide packet transmission network architecture to provide always-connected communication services to processing system 300.

Processing system 300 could be any processing system configured to exchange information with the communication network 106 and provide retrieved information to at least one of the PDA 306, the computer system 308, and the telephone 307. Processing system 300 could use computer interface system 305, the telephone interface system 304, the wireless interface system 303, the wireline network interface system 309, and/or the wireless network interface system 310 for network connectivity and information retrieval.

Those skilled in the art will appreciate that in some embodiments the present invention, the communication device 100 may not include the wireline network interface system 309, the wireless network interface system 310, or both, where network connectivity is provided by one of the wireless interface system 303 or the telephone interface system 304.

The information could be any information provided over the communication network 106. Some examples of information include without limitation, content information, data file transfer, video information, audio information, e-mail, world wide web browsing using PUSH or PULL technologies, facsimile communication, audio broadcasts, and video broadcasts.

Operationally, the processing system 300 controls the flow and presentation of the information to the PDA 306, the telephone 307, and the computer system 308 based on instructions defined in the user profile. The user controls the user profile to provide instructions to the processing system 300 that define when, where, what, and how the information is provided to the PDA 306, the telephone 307, and the computer system 308. The user profile could be stored in memory 301 and accessed using computer system 308 and/or processing system 300, or the user profile could be stored on computer system 308.

The following are several examples of the operation of the processing system 300 based on the user profile. Those skilled in the art will appreciate that an exhaustive illustration of all possible operations of the processing system 300 would be impractical. As a result, the present invention is not limited to the specific examples and illustrations discussed below, but only by the claims and their equivalents.

The user profile could be configured to define various time intervals for information retrieval and update. The time intervals could be individually defined for specific types of information. For example, all information could be retrieved at the defined time interval(s) or the information retrieval could be bifurcated such that e-mail information is retrieved hourly while weather reports are retrieved only in the morning, and stock quotes continually updated during the course of the day.

The user profile could also be configured to designate various delivery requirements. For example, email could be delivered to the PDA 306 during mobile operation and to the computer system 308 when the PDA 306 is docked in the docking interface system 302. In another example, email could be delivered to the PDA 306 and a copy delivered to the computer system 308. In yet another example, email could be delivered as described above while weather information and/or file transfer information is only delivered to the computer system 308.

The user profile could also be configured to designate specific delivery formats. For example, retrieved information could be provided to a screen on the designated device e.g. computer system 308 or to a memory in the designated device. Information could also be cached in memory 301 for instant access by one of the PDA 306, the telephone 307, and the computer system 308.

The processing system 300 could also control information delivery in combination with the user profile. For example, where the information to be delivered is too large for the intended delivery device, e.g. the screen on the PDA 306, the processing system 300 could control delivery to provide only portions of the information to the PDA 306 and provide the complete information to another device such as the computer system 308. Similarly, the processing system 300 could reformat the information for delivery to the designated device to accommodate device limitations. For example, a weather map designated for delivery to the PDA 306 could be provided in a text format to the PDA 306 and in graphical format to the computer system 308.

Processing system 300 could also coordinate with synchronization software on the computer system 308 or the PDA 306 to deliver information. For example, processing system 300 could wake up during power down modes, components on computer system 308 necessary for storing and formatting retrieved information. Those skilled in the art will appreciate that the processing system 300 could accommodate various other wireless and wireline devices although only the PDA 306, the telephone 307, and the computer system 308 are shown on FIG. 3 for clarity.

Figure 4:
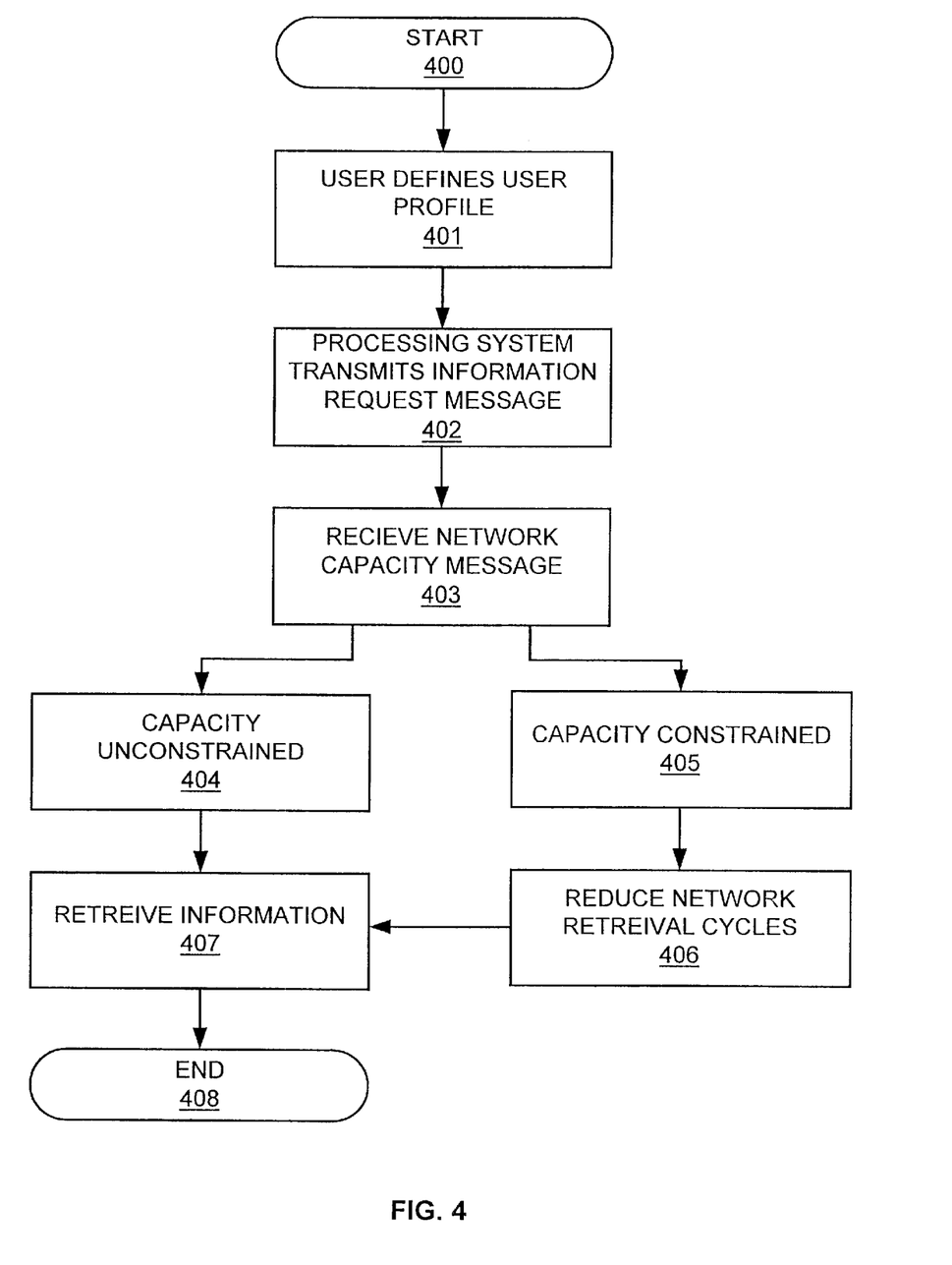
FIG. 4 illustrates an example of the operational steps for exchanging information with a communication network using a communication device according to the present invention.

During information retrieval, the processing system 300 dynamically adjusts the information retrieval requests based on the capacity of the communication network 106. FIG. 4 is a flow chart illustrating one example of the dynamic adjustment of the information retrieval based on the capacity of the communication network 106 according to the present invention.

Information Exchange Operation FIG. 4:

On FIG. 4 the operation begins at step 400. At step 401, the user defines the desired information and delivery requirements in the user profile and configures the desktop synchronization software on computer system 308 and/or PDA 306. The user could also specify information categories to be cached in memory 301 for instant access. At step 402, the processing system 300 transmits an information request message to the communication network 106 at the designated information retrieval time defined by the user profile. The communication network 106 processes the information request message and provides a network capacity message to the processing system 300 at step 403. If the network capacity message indicates the capacity is unconstrained, for example network utilization is 40%, processing continues at step 404 and the information is retrieved from the communication network 106 at normal retrieval cycles at step 407.

If the network capacity message indicates the capacity is constrained, processing continues at step 405, and the processing system 300 reduces the information retrieval cycles at step 406 by the amount of capacity constraint. For example, the network capacity message at step 405 could indicate that the communication network 106 utilization is at 90% at step 405. Responsive to the 90% utilization, the processing system 300 reduces the information retrieval cycles by 90% at step 406 and the information is retrieved at step 407 at the reduced retrieval rate.

If during the retrieval of information at step 407 the capacity of the communication network 106 changes, the processing system 300 dynamically adjusts the information retrieval cycles to accommodate the capacity change. For example, if the processing system 300 receives a network capacity message indicating that the network utilization has changed from 40% to 60%, the processing system 300 could reduce the information retrieval cycles during the information retrieval at step 407 by 20%. Alternatively, the processing system 300 could reduce the information retrieval cycles by the full 60%. Similarly, if the processing system 300 receives a network capacity message indicating the network utilization has changed from 90% to 60%, the processing system 300 could increase the information retrieval cycles during the information retrieval at step 407 by 30%. Thus, the processing system 300 continually adjusts the information retrieval based on the amount of network constraint during the information retrieval at step 407. Upon completion of the information retrieval at step 407, the processing ends at step 408.

The above-described processing systems can include instructions that are stored on storage media. The instructions can be retrieved and executed by a processor. Some examples of instructions are software, program code, and firmware. Some examples of storage media are memory devices, tape, disks, integrated circuits, and servers. The instructions are operational when executed by the processor to direct the processor to operate in accord with the invention. The term "processor" refers to a single processing device or a group of inter-operational processing devices. Some examples of processors are integrated circuits and logic circuitry. Those skilled in the art are familiar with instructions, processors, and storage media.

Those skilled in the art will appreciate variations of the above described embodiments that fall within the scope of the invention. As a result, the invention is not limited to the specific examples and illustrations discussed above, but only by the following claims and their equivalents.

We claim:

1. A communication device, comprising:
    a processing system configured to exchange information with a communication network at user-controllable time intervals, provide retrieved information to at least one of a wireless communication device and a wireline communication device based on a user profile, and dynamically adjust the information exchange based on a network capacity;
    a network interface system coupled to the processing system and configured to exchange information retrieval messages with the communication network and exchange the information with the communication network under control of the processing system;
    a wireless interface system coupled to the processing system and configured to exchange information with the wireless communication device under control of the processing system; and
    a wireline interface system coupled to the processing system and configured to exchange information with the wireline device under control of the processing system.

2. The communication device of claim 1 wherein the processing system is further configured to receive a network capacity message from the communication network and process the network capacity message to reduce information retrieval cycles.

3. The communication device of claim 2 wherein the processing system is further configured to receive the network capacity message from the communication network and process the network capacity message to increase the information retrieval cycles.

4. The communication device of claim 3 wherein the network capacity message includes an indication of the amount the communication network capacity is constrained and the processing system is further configured to process the network capacity message to reduce the information retrieval cycles based on the indication of the amount the communication network capacity is constrained.

5. The communication device of claim 3 wherein the network capacity message includes an indication of the amount the communication network capacity is relieved and the processing system is further configured to process the network capacity message to increase the information retrieval cycles based on the indication of the amount the communication network capacity is relieved.

6. The communication device of claim 1 wherein the processing system is further configured to provide at least a portion of the retrieved information to the wireline device and provide at least a portion of the information to the wireless device.

7. The communication device of claim 1 wherein the processing system is further configured to provide the retrieved information to the wireline device and the wireless device.

8. The communication device of claim 1 wherein the processing system is further configured to reformat the retrieved information and provide the reformatted information to at least one of the wireline device and the wireless device.

9. The communication device of claim 1 wherein the processing system is further configured to cache the retrieved information for instant access by the wireline device and the wireless device.

10. The communication device of claim 1 wherein the wireless interface system comprises a docking interface system for the wireless device.

11. The communication device of claim 1 wherein the network interface system comprises a wireless interface system.

12. The communication device of claim 1 wherein the network interface system comprises a second wireline interface system.

13. The communication device of claim 12 wherein at least one of the wireline interface system and the second wireline interface system comprises a computer interface system.

14. The communication device of claim 12 wherein at least one of the wireline interface system and the second wireline interface system comprises a telephone interface system.

15. The communication device of claim 1 wherein the wireline communication device comprises a computer system.

16. The communication device of claim 1 wherein the wireline communication device comprises a telephone.

17. The communication device of claim 1 wherein the wireless communication device comprises a telephone.

18. The communication device of claim 1 wherein the wireless communication device comprises a personal digital assistant.

19. The communication device of claim 1 wherein the wireless communication device comprises a computer system.

20. The communication device of claim 1 wherein the wireless communication device comprises a pager.

21. The communication device of claim 1 wherein the information comprises audio information.

22. The communication device of claim 1 wherein the information comprises data information.

23. The communication device of claim 1 wherein the information comprises video information.

24. A method of operating a communication device, the method comprising:
    exchanging information with a communication network at user-controllable time intervals;
    dynamically adjusting the information exchange based on a network capacity; and
    providing retrieved information to a wireless communication device and a wireline communication device based on a user profile.

25. The method of claim 24 wherein exchanging the information with the communication network further comprises:
    exchanging information retrieval messages with the communication network.

26. The method of claim 24, the method further comprising:
    receiving a network capacity message from the communication network; and
    processing the network capacity message to reduce information retrieval cycles.

27. The method of claim 26, the method further comprising:
    receiving the network capacity message from the communication network; and
    processing the network capacity message to increase the information retrieval cycles.

28. The method of claim 27 wherein the network capacity message includes an indication of an amount the communication network capacity is constrained.

29. The method of claim 28, the method further comprising:
    processing the network capacity message to reduce the information retrieval cycles based on the indication of the amount the communication network capacity is constrained.

30. The communication device of claim 27 wherein the network capacity message includes an indication of the amount the communication network capacity is relieved.

31. The method of claim 30, the method further comprising:
    processing the network capacity message to increase the information retrieval cycles based on the indication of the amount the communication network capacity is relieved.

32. The method claim 24, the method further comprising:
    providing at least a portion of the retrieved information to the wireline device; and
    providing at least a portion of the retrieved information to the wireless device.

33. The method of claim 24, the method further comprising:
    providing the retrieved information to the wireline device and the wireless device.

34. The method of claim 24, the method further comprising:
    reformatting the retrieved information; and
    providing the reformatted information to at least one of the wireline device and the wireless device.

35. The method claim 24, the method further comprising:
    caching the retrieved information for instant access by the wireline device and the wireless device.

36. The method of claim 24 wherein the wireless interface system comprises a docking interface system for the wireless device.

37. The method of claim 24 wherein the network interface system comprises a wireless interface system.

38. The method of claim 24 wherein the network interface system comprises a second wireline interface system.

39. The method of claim 38 wherein at least one of the wireline interface system and the second wireline interface system comprises a computer interface system.

40. The method of claim 38 wherein at least one of the wireline interface system and the second wireline interface system comprises a telephone interface system.

41. The method of claim 24 wherein the wireline communication device comprises a computer system.

42. The method of claim 24 wherein the wireline communication device comprises a telephone.

43. The method of claim 24 wherein the wireless communication device comprises a telephone.

44. The method of claim 24 wherein the wireless communication device comprises a personal digital assistant.

45. The method of claim 24 wherein the wireless communication device comprise a computer system.

46. The method of claim 24 wherein the wireless communication device comprises a pager.

47. The method of claim 24 wherein the information comprises audio information.

48. The method of claim 24 wherein the information comprises data information.

49. The method of claim 24 wherein the information comprises video information.

50. A software product comprising:

communication software operational when executed by a processor to direct the processor to exchange information with a communication network at user-controllable time intervals, provide retrieved information to at least one of a wireless communication device and a wireline communication device based on a user profile, and dynamically adjust the information exchange based on a network capacity;

network interface system software operational when executed by the processor to direct a network interface system to exchange information retrieval messages with the communication network and exchange the information with the communication network;

wireless interface system software operational when executed by the processor to direct a wireless interface system to exchange information with the wireless communication device;

wireline interface system software operational when executed by the processor to direct a wireline interface system to exchange information with the wireline device; and a software storage medium operational to store the communication software, the network interface system software, the wireless interface system software, and the wireline interface system software.

51. The product of claim 50 wherein the communication software is further operational to direct the processor to process a network capacity message to reduce information retrieval cycles.

52. The product of claim 51 wherein the communication software is further operational to direct the processor to process the network capacity message to increase the information retrieval cycles.

53. The product of claim 52 wherein the network capacity message includes an indication of the amount the communication network capacity is constrained.

54. The product of claim 53 wherein the communication software is further operational to direct the processor to process the network capacity message to reduce the information retrieval cycles based on the indication of the amount the communication network capacity is constrained.

55. The product of claim 53 wherein the network capacity message includes an indication of the amount the communication network capacity is relieved.

56. The product of claim 55 wherein the communication software is further operational to direct the processor to process the network capacity message to increase the information retrieval cycles based on the indication of the amount the communication network capacity is relieved.

57. The product of claim 50 wherein the communication software is further operational to direct the processor to provide at least a portion of the retrieved information to the wireline device and provide at least a portion of the information to the wireless device.

58. The product of claim 50 wherein the communication software is further operational to direct the processor to provide the retrieved information to the wireline device and the wireless device.

59. The product of claim 50 wherein the communication software is further operational to direct the processor to reformat the retrieved information and provide the reformatted information to at least one of the wireline device and the wireless device.

60. The product of claim 50 wherein the communication software is further operational to direct the processor to cache the retrieved information for instant access by the wireline device and the wireless device.

* * * * *